Patented May 15, 1945

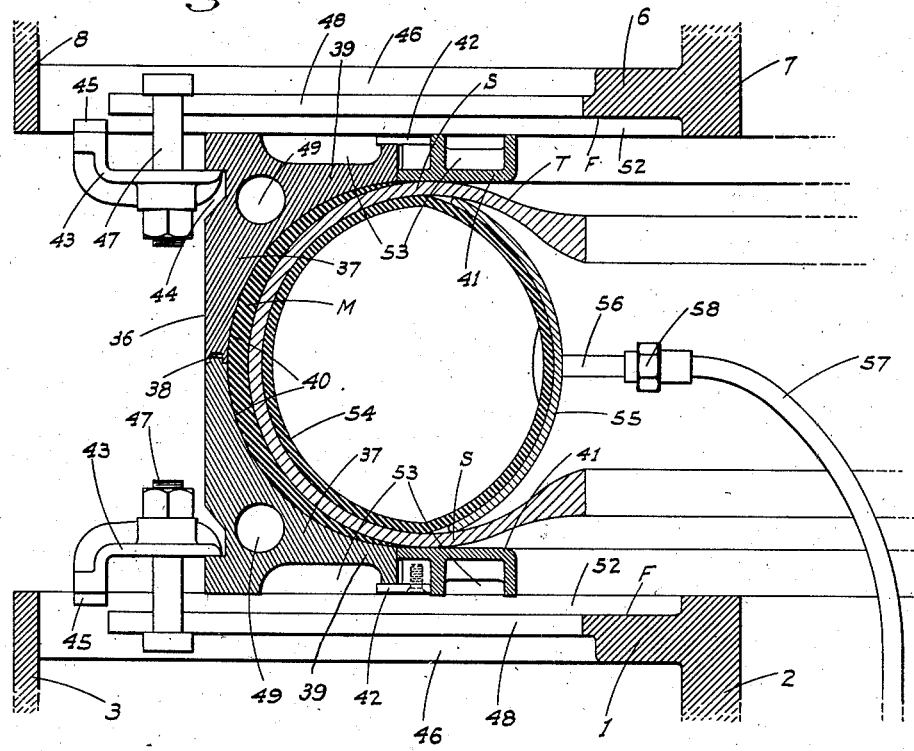

2,375,784

UNITED STATES PATENT OFFICE 2,375,784

INTERCHANGEABLE MATRIX TREAD VULCANIZING MOLD

Edwin A. Glynn, Lodi, Calif., assignor to Super Mold Corporation of California, Lodi, Calif., a corporation of California Application March 22, 1943, Serial No. 479,999

3 Claims. (Cl. 18—18)

This invention relates in general to the art of tire retreading and recapping, identified hereinafter generally as tread vulcanizing, and in particular the present invention is directed to an improved tread vulcanizing mold.

Under certain conditions, as for example in the aircraft industry where tire sizes are many, it is desirable to have available a tread vulcanizing mold which is widely variable in its tire size capacity. It is therefore one of the objects of this invention to provide a tread vulcanizing mold which is arranged for the ready reception of tread vulcanizing matrix assemblies of different sizes, both diametrally and transversely.

A further object of this invention is the provision of a tread vulcanizing mold which includes, in combination with a bed plate and head plate arrangement wherein one of said plates is movable axially and power actuated, an initially separate matrix assembly forcefully engaged between said plates in centered relation; said matrix assembly comprising full circle matching halves and the assembly being held in place radially and axially of said plates by unique securing means. Such securing means comprises circumferentially spaced locking clamps or dogs engaged between corresponding halves of the matrix assembly and said plates, said clamps being adjustable axially of the mold, whereby to accommodate matrix assemblies of different diameters, but are normally held in place by a securing bolt which extends through a radial slot in the corresponding one of the plates.

An additional object of this invention is to provide a tread vulcanizing mold which includes a bed plate, a concentric relatively axially movable head plate, a matrix assembly adapted to be forcefully engaged between said plates, and separate means, independent of said plates, operative to heat said matrix assembly; the plates and engaged portions of the matrix assembly being formed in unique structural arrangement so as to minimize heat exchange or transfer from the matrix assembly to the plates whereby to increase the effectiveness and economy of the mold.

A still further object of this invention is to provide a tread vulcanizing mold as in the preceding paragraph in which the adjacent faces of the plates are formed with a plurality of circumferentially spaced, radially extending ribs which project toward and intersect the mold assembly; the engaged surface of the latter being annularly channeled so as to reduce the area of contact with said ribs.

It is also an object of this invention to provide a unique selectively controlled drive mechanism for the herein described tread vulcanizing mold, said mechanism being operative to cause relative separating or approaching movement of the matrix assembly engaging plates, and in the latter event to cause forceful engagement of said assembly in clamped relation between said plates.

This invention has, for an additional object, the provision of a tread vulcanizing mold which includes a bed plate, a concentric head plate mounted for relative axial movement, power actuated means to effect such movement, and an initially separate matrix assembly adapted to be forcefully clamped between said plates; said assembly having heating means associated therewith independently of the plates.

These objects I accomplish by means of such structure and relative arrangement of parts as will fully appear by a perusal of the following specification and claims.

In the drawings similar characters of reference indicate corresponding parts in the several views:

Figure 3 is an enlarged fragmentary cross section on line 3—3 of Fig. 1.

Figure 4 is a fragmentary sectional elevation, enlarged, of the clutch unit employed between the drive motor and the head plate actuating mechanism.

Figure 1:
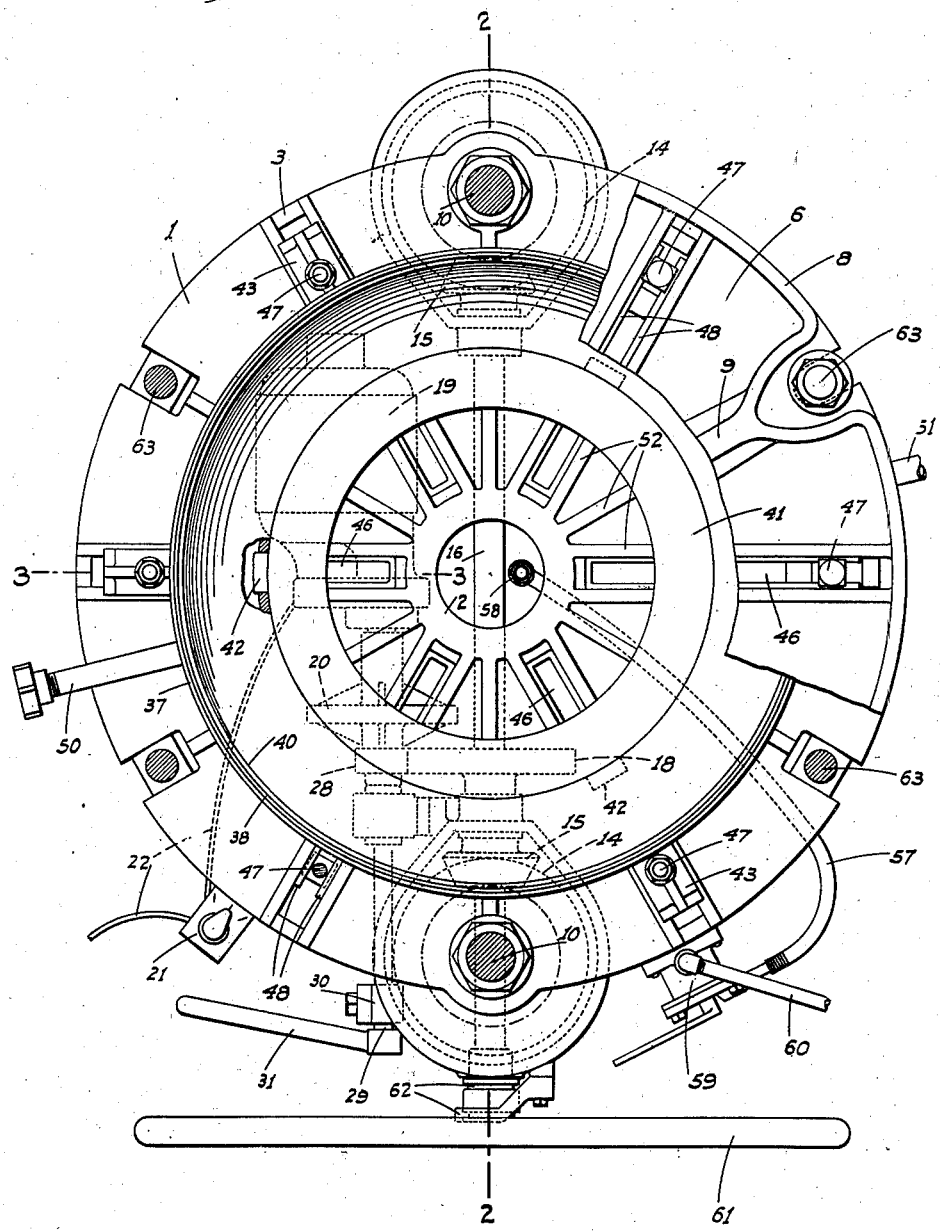
Figure 1 is a plan view of the improved mold; the head plate being mainly broken away.
Figure 2:
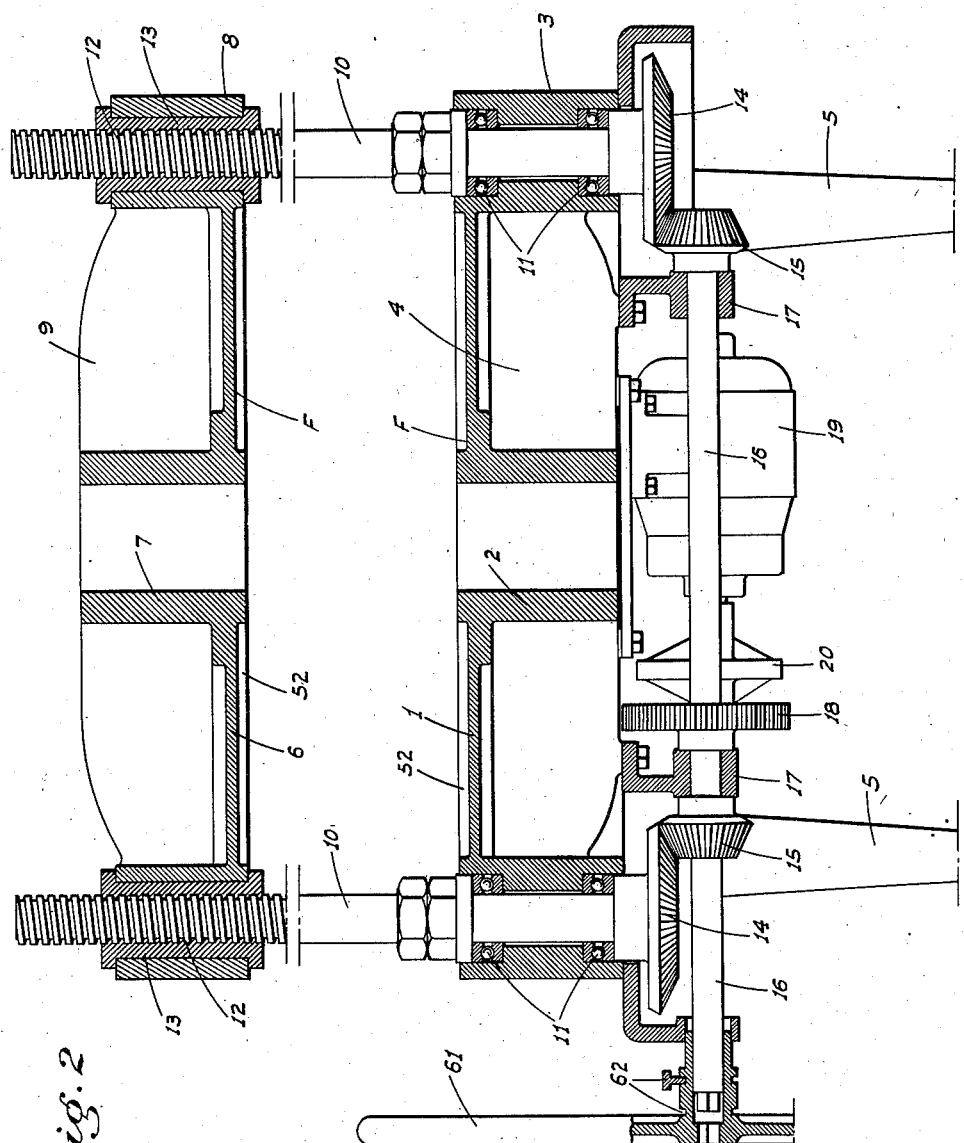
Figure 2 is a sectional elevation on line 2—2 of Fig. 1.

Referring now more particularly to the characters of reference on the drawings, the improved tread vulcanizing mold comprises a circular bed plate, indicated generally at 1, said bed plate being disposed horizontally and including, in integral relation, a central hub 2 and a depending peripheral flange 3. Circumferentially spaced strengthening webs 4 extend radially between the hub 2 and the flange 3. The bed plate is supported some distance above the floor by legs 5.

A matching head plate 6 is disposed in adjacent but spaced relation above the bed plate and in axial alinement with the latter; adjacent faces, indicated generally at F, of the plates 1 and 6 being parallel. The head plate 6 likewise includes a hub 7, an upstanding peripheral flange 8 and strengthening webs 9 extending therebetween; the hub, flange and webs of the plates 1 and 6 projecting in opposite directions from the faces F.

The head plate 6 is supported above the bed plate for axial movement by a pair of vertical spindles 10 which are rotatably but axially immovably journaled in connection with the bed plate by bearing means indicated generally at 11. These spindles 10 project vertically some distance above the bed 1 and threadingly engage, as at 12, in vertical sleeves 13 fixed in the head plate 6 adjacent its periphery and at diametrally opposed points therein.

By simultaneous rotation of the spindles 10 in one direction or the other, the head plate is either raised or lowered relative to the bed plate and for the purpose as will hereinafter appear. Simultaneous rotation of the spindles 10 is accomplished through the medium of a drive mechanism which comprises the following:

A bevel gear 14 is secured on the lower end of each spindle 10 below the bed plate and said bevel gears are driven by pinions 15 fixed on a horizontal shaft 16 journaled beneath the bed plate on depending brackets 17. A spur gear 18 is fixed on shaft 16 and is driven, at reduced speed, from a motor 19 mounted on and depending from the bed plate; a clutch unit, indicated generally at 20, being interposed between the gear 18 and the motor 19. The motor 19 is of reversible type and is controlled by means of a manually actuated reversing switch 21 mounted at a suitable exposed point on the mold and interposed in the current supply cable 22.

The clutch unit 20 is shown in detail in Fig. 4, and comprises the following:

The drive shaft 23 of motor 19 extends axially into and is keyed to the elongated hub 24 of a radial clutch disc 25 formed integral with said hub. The other disc or element of the clutch is formed as a shallow cup 26 having a clutch lining 27 of friction material therein; the clutch disc 25 seating in said cup 26. The cup 26 has a pinion 28 rigidly mounted in axial connection therewith, said pinion 28 meshing in driving relation with the gear 18.

As will be apparent, limited axial movement of the cup 26 in the direction of the disc 25 will result in coupling of the clutch and rotation of the pinion 28 from the motor shaft 23. Conversely, movement of the cup in an opposite direction will uncouple the clutch. Such limited movement of the cup 26 is accomplished through the medium of a control shaft 29 which extends below the bed plate from a point beyond the periphery of the latter; said shaft being rotatably supported adjacent its outer end by a bracket 30; a radial hand lever 31 being fixed on shaft 29 beyond the bracket 30 and the periphery of the bed plate. Intermediate the pinion 28 and bracket 30 the shaft 29 terminates adjacent a fixed collar 32 which is tapped from end to end. A threaded bushing 33 is pinned to shaft 29, as at 34, and is threaded through the fixed collar 32. Shafts 29 and 23 are held in alinement and the pinion and clutch cup unit are supported by a floating shaft 29a seated at its ends in hub 24 and bushing 33 and extending axially through the pinion 28 and cup 26. By this construction, driving of shaft 23 does not tend to rotate shaft 29. A thrust bearing unit 35 freely surrounds shaft 29a and is engaged between adjacent ends of pinion 28 and collar 32.

As will be obvious, swinging movement of the lever 31 causes the threaded bushing 33 to be shifted in a direction either toward or away from the pinion 28, and this movement is imparted to the pinion 28 and cup 26, resulting either in engagement or disengagement of the clutch. When the motor is running in one direction or the other, engagement of the clutch causes raising or lowering, respectively, of the head plate.

A tread vulcanizing matrix assembly, indicated generally at 36, is normally but removably disposed between the bed plate and head plate and is adapted to be forcefully clamped between the adjacent faces F of the latter. The bed plate and cooperating head plate are of relatively large diameter, whereby to accommodate matrix assemblies of different diameters therebetween, and further the vertical adjustability of the head plate permits the mold to accommodate matrix assemblies of different dimensions axially.

While each mold will preferably include a number of matrix assemblies of different sizes, only one is here shown and described, for the purpose of simplicity. Such matrix assembly comprises a pair of full-circle matching matrix halves, indicated at 37, said halves normally being engaged in matching cooperating relation. An annular locking bead and groove arrangement 38 normally prevents radial displacement of one matrix half relative to the other without restricting axial separation thereof. The matrix halves each includes a matrix skirt 39. The inner surface of the matrix halves 37 and corresponding matrix skirts 39 form a continuous tread vulcanizing surface 40.

Under some conditions the matrix skirts 39 are extended radially inwardly by tire sidewall retaining rings or skirt extensions 41 of full-circle configuration which engage at their outer periphery with the end of the corresponding skirt 39; said rings 41 being of such axial extent that when the outside thereof is flush with the corresponding side of the adjacent matrix half, the inside of said rings is flush with and forms a continuation of the adjacent portion of surface 40.

Countersunk locating and retaining tongues 42 project radially outwardly from the outside of rings 41 in circumferentially spaced relation and seat in corresponding grooves in the adjacent portion of the corresponding matrix half. Consequently the rings 41, when mounted in connection with the matrix halves, are held against displacement axially inwardly.

When in use the matrix assembly is centered and clamped between the bed plate and head plate, as shown in Fig. 3. Relative radial displacement of the matrix assembly when the mold is in operation, or escape of either of the corresponding matrix halves from the corresponding plate when said halves are separated, is prevented by means of normally locked but radially adjustable clamps 43. A plurality of these clamps in circumferentially spaced relation is employed in connection with each matrix half. Each clamp is of generally L-shaped configuration with one leg of the clamp seating in an annular shoulder-forming channel 44 in the periphery of the corresponding matrix half, and the other end of the clamp seats against the adjacent plate, the latter end of each clamp including a depending guide element 45 which engages in a radial groove 46 in the plate. A securing bolt 47 extends through the clamp intermediate its ends; the headed end of the bolt being lowermost and engaging from below against abutment flanges 48 which project inwardly from opposite sides of the groove 46.

By virtue of the adjustable clamp arrangement above described, matrix assemblies of different diameters can be effectively clamped in connection with the plates.

The matrix halves each include a steam chamber 49 thereabout, each steam chamber having a separate inlet pipe 50 and an outlet pipe 51 connected therewith. Flexible supply and discharge conduits (not shown) are adapted for connection with pipes 50 and 51.

As the above heating means for the matrix assembly is independent of the bed plate 1 and head plate 6, not only can the matrix assembly be removed and replaced with facility, but also the following arrangement can be employed to minimize heat transfer or exchange between the matrix assembly and said plates.

The adjacent faces F of the bed plate 1 and head plate 6 are formed with a plurality of circumferentially spaced pairs of radially extending axially inwardly projecting ribs 52, while the engaged surfaces of the matrix halves 37 and rings 41 are annularly channeled, as at 53. Thus the area of contact between the plates and the adjacent portions of the matrix assembly is not great. This is an important feature, as it minimizes heat exchange and substantially increases the effectiveness and economy of the mold.

In use, the matrix assembly is secured to the bed and head plates by the clamps 43, and the matrix halves axially separated. The tire T, to which the new tread material M has previously been applied, is then seated in the lower matrix half, while the upper matrix half remains in vertically spaced relation. Thereafter the head plate 6 is lowered to bring the upper matrix half into matching and cooperating relation with the lower half, and to forcefully clamp the matrix assembly between the plates 1 and 6. When the head plate 6 is brought into forceful engagement with the matrix assembly, the clutch unit 20 will slip sufficiently to prevent damage to the motor 19 should the operator not immediately disengage said clutch unit by proper manipulation of lever 31.

A conventional air bag 54 is disposed in the tire and retained in place by a vulcanizing rim 55, here shown as being of the type known as an inside curing rim. The bag 54 includes a valve stem 56 to which an air hose 57 is attached by a quick coupling 58. The air hose leads from a hand actuated control valve 59 mounted on the outside of the mold, said hose extending from said valve downwardly beneath the mold and thence upwardly through the hub 2 of the bed plate 1. Air pressure is supplied to the valve 59 by a conduit 60.

Upon inflation of the air bag 54, the newly applied tread material M is forcefully pressed against the matrix surface 40, said surface being heated from the steam chambers 49 to effect the vulcanizing process. As clearly shown in Fig. 3, the surface 40 conforms symmetrically to the tread of the tire, whereas the rings 41 engage the side walls S of the tire to prevent undesirable lateral expansion or stretching thereof.

When the vulcanizing process has been completed the matrix assembly is separated by raising the head plate 6, whereupon the tire may be withdrawn from said assembly.

Under certain conditions it may be desirable to employ manual means to actuate the head plate raising and lowering mechanism. To accomplish this, a hand wheel 61 is rotatably mounted on an extended end portion of shaft 16, but is normally out of driving relation therewith. The wheel may, however, be brought into driving engagement with the shaft 16 by suitable means, such as indicated generally at 62.

As a safety feature the head plate is locked in connection with the bed plate, when the mold is in operation, by a plurality of swing bolts 63 pivotally connected with the bed plate at circumferentially spaced points and extending through cooperating notches in the head plate, the nuts on the swing bolts engaging the top of the head plate.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. A tread vulcanizing mold comprising a bed plate and a head plate disposed in adjacent facing relation and mounted for relative axial movement, adjacent faces of said plates being parallel, an annular matrix assembly disposed between said plates and adapted to be forcefully engaged therebetween, and means, independent of the plates, operative to heat the matrix assembly; the adjacent faces of the plates having radially extending axially and inwardly projecting ribs formed thereon in circumferentially spaced relation, and the engaged sides of the matrix assembly being angularly channeled whereby said ribs intersect the channels so as to minimize heat transfer from the matrix.

2. A tread vulcanizing mold comprising a bed plate and a head plate disposed in adjacent facing relation and mounted for relative axial movement, adjacent faces of said plates being parallel, an annular matrix assembly disposed between said plates and adapted to be forcefully engaged therebetween, said assembly comprising full-circle matrix halves normally disposed in engaged matching relation, the plates having a plurality of circumferentially spaced radial slots therethrough, clamps securing each matrix half to the corresponding plate and including bolts passing through said slots whereby the clamps are adjustable radially of the mold, radially extending axially and inwardly projecting ribs formed on said faces, said ribs being relatively narrow and disposed along opposite sides of said slots, the rib engaging sides of said matrix halves being annularly channeled to an extent that the unchanneled portions of said sides are relatively narrow radially of said plates whereby to minimize the area of contact between the plates and the matrix assembly, and means, independent of said plates, operative to heat the matrix assembly.

3. A tread vulcanizing mold comprising a bed plate and a head plate disposed in axially spaced facing relation, said plates being mounted for power actuated relative axial movement, power means operative to effect such movement, an initially separate matrix assembly seated on one plate and adapted to be forcefully engaged between said plates, means to heat said matrix assembly, and means releasably securing the matrix assembly in connection with at least one of said plates; said last named means comprising a plurality of circumferentially spaced L-shaped clamps, a shoulder on the matrix assembly adjacent each clamp and facing away from said one plate, one leg of each clamp engaging said adjacent shoulder on the matrix assembly and the other leg of each clamp seating on said one plate; there being a bolt connecting each clamp intermediate its ends with said one plate, each of said bolts extending through a radial slot in said one plate whereby upon loosening of each bolt the corresponding clamp, together with said bolt, is adjustable radially of the mold but remains in connection therewith.

EDWIN A. GLYNN.